(No Model.)
F. J. HUELSEN & J. NAGEL.
BICYCLE.
No. 455,945. Patented July 14, 1891.
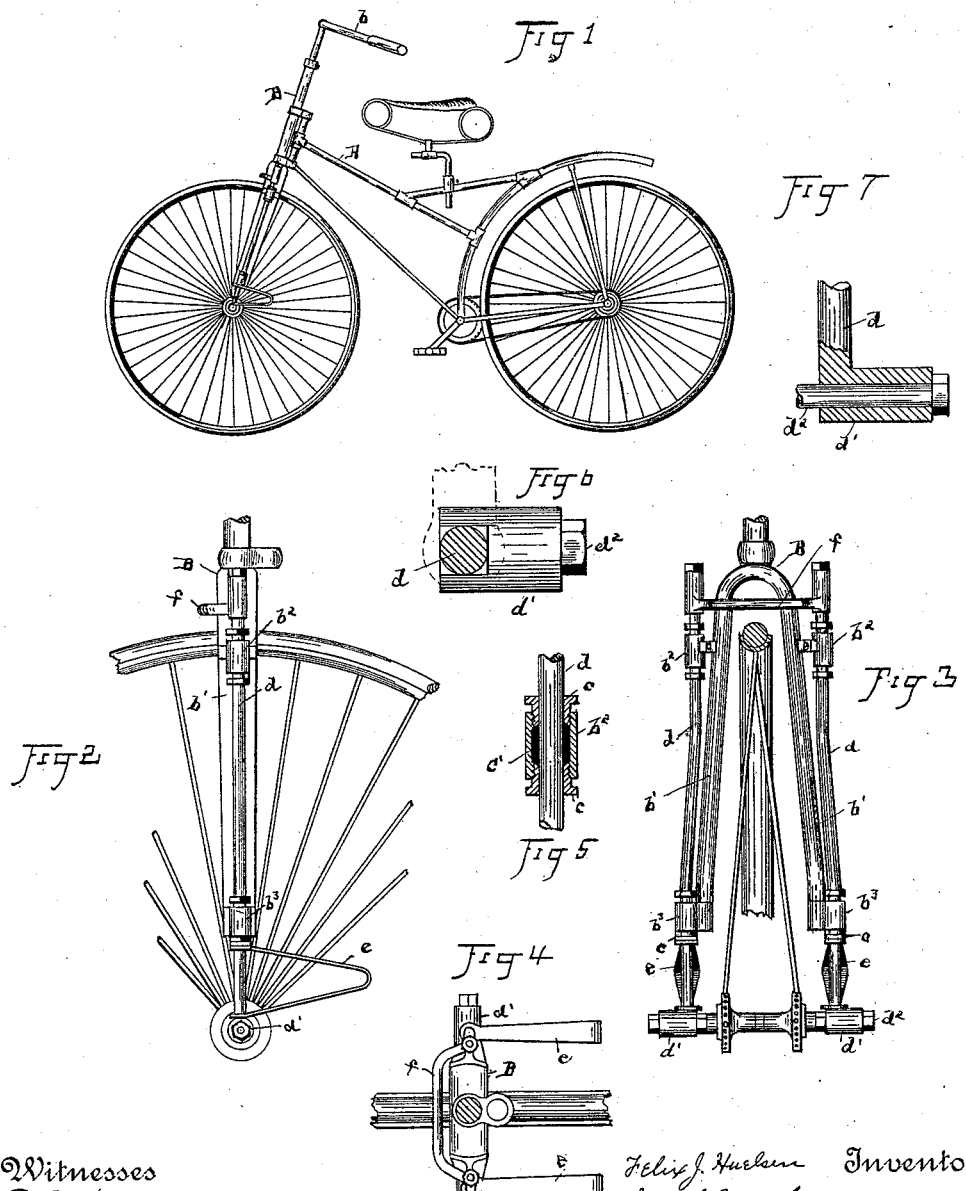

UNITED STATES PATENT OFFICE.

FELIX J. HUELSEN AND JACOB NAGEL, OF CLEVELAND, OHIO.

BICYCLE.

SPECIFICATION forming part of Letters Patent No. 455,945, dated July 14, 1891.

Application filed November 19, 1890. Serial No. 371,916. (No model.)

*To all whom it may concern:*

Be it known that we, FELIX J. HUELSEN and JACOB NAGEL, citizens of the United States, residing at Cleveland, in the county of Cuyahoga and State of Ohio, have invented certain new and useful Improvements in Bicycles; and we do hereby declare that the following is a full, clear, and exact description of the invention, which will enable others skilled in the art to which it appertains to make and use the same.

Our invention relates to improvements in bicycles in which we provide means and devices to obviate and overcome the excessive vibration of the frame-work of the bicycle in riding over rough roadways; and to this end the device, as shown in the accompanying drawings, consists of the following figures.

Figure 1 is a side elevation of the bicycle known as the "Safety" type, embodying our invention. Fig. 2 is an enlarged detached elevation showing more clearly the construction of that part of the device which is embodied in our invention. Fig. 3 is a front elevation of Fig. 2, while Fig. 4 is a top plan view of Figs. 2 and 3. Fig. 5 is an enlarged cross-section of one of the side bearings of the device. Fig. 6 is an enlarged plan view of the machine. Fig. 7 is an enlarged elevation in section, showing more especially the connection between the trunnion and the stem portion of said rod.

In the accompanying drawings, A illustrates the frame of the bicycle having a steering-head B, provided with the usual handle-bars $b$. The steering-head B is bifurcated, as shown in Fig. 3, so as to reach down on each side of the forward wheel by means of extensions $b'$. These extensions have brackets respectively $b^2$ $b^3$, the latter being secured in the lower end of the stem $b'$ at the steering-head B. These brackets are provided with follower packing-nuts $c$, and through them pass the side supporting-rods $d$. The packing follower-nuts afford means for taking up any wear of these parts, and also provide a means for lubricating the side rods $d$ through the packing $c'$, which may be saturated with any desired lubricant. The lower end of the side rods $d$ has a trunnion projection $d'$, through which the spindle $d^2$ of the forward wheel passes. Just above this trunnion portion the rods $d$ are square in cross-section, as shown in Fig. 6, to accommodate the square opening in the lower member of the angular spring $e$, and thus keep the spring from turning on a horizontal plane. The upper member of said spring has an opening for the passage of the rods $d$, the said spring abutting against the follower packing-nut $c$ of the lower bracket $b^3$. The upper ends of the rods $d$ are united by a joining-section $f$, which insures a rigid and solid extremity of these parts and obviates any undue vibration thereof. As the wheel strikes an obstruction the trunnion-bearings $d'$, through the side rods $d$, are forced in an upward direction, compressing the spring $e$, and, again, as the wheel has passed over the obstruction, the spring asserts itself and regains its normal position. The frame A is connected with the steering-head B in the usual manner above the bifurcation of said head into the extensions $b'$, and the springs $e$ therefore cushion the seat of the rider as well as dissipate the quiver and vibrations of the steering-wheel on the handle.

What we consider as an advantageous feature in our device is the simplicity of the parts, their ease of assembling, and withal the effective manner in which they accomplish their purpose—that is, obviate the excessive vibration of the frame A itself, attendant upon most of the bicycles at present in use; and to this end we have devised the mechanism illustrated in the accompanying drawings and described in this specification.

Having thus described our invention, what we claim as new, and desire to secure by Letters Patent, is—

1. A bifurcated steering-head, a steering-wheel and axle therefor, standards having bearing ends mounted upon the ends of said axle, said standards being joined by a yoke or keeper at their upper end, and sliding connections from such standards to the steering-head, substantially as described.

2. A bifurcated steering-head, a wheel and axle therefor, standards upon the ends of such axle having bearing thereon, a yoke joining the upper ends of such standards, bearing-connections projecting from the steering-head, in which said standards are adapted to slide, and a spring between the standards and the said head, substantially as described.

3. A steering-head, a wheel and axle therefor, separate standards, lateral projections thereon at their lower end serving as bearings for the wheel-axle, an independent yoke joining such standards at their upper ends, and bearings between the standards and the head, said bearings being located only adjacent to said standards, substantially as described.

Witness our hands to the foregoing specification this 14th day of November, 1890.

FELIX J. HUELSEN.
JACOB NAGEL.

Witnesses:
N. S. AMSTUTZ,
NELLIE L. McLANE.